UNITED STATES PATENT OFFICE.

ANSON W. ALLEN AND EUGENE GUY LILLY, OF BIRMINGHAM, ALABAMA.

METHOD OF PRODUCING STEEL AND HIGH-PHOSPHORUS SLAG.

1,193,496.          Specification of Letters Patent.      Patented Aug. 8, 1916.

No Drawing.      Application filed June 18, 1915. Serial No. 34,839.

*To all whom it may concern:*

Be it known that we, ANSON W. ALLEN and EUGENE GUY LILLY, citizens of the United States, residing in Birmingham, Alabama, have invented certain new and useful Improvements in Methods of Producing Steel and High-Phosphorus Slag, of which the following is a specification.

It has heretofore been proposed to manufacture steel and at the same time secure a slag rich in soluble phosphates for use as a fertilizer. The processes proposed contemplate the refining in an open-hearth or an electric furnace of pig iron containing a high percentage of phosphorus and a comparatively low percentage of silicon, or of a mixture of such pig iron with scrap, using a lime slag.

With the iron ore of foreign countries containing a comparatively high content of phosphorus such processes have been found practicable and economical. But most of the ores of this country are low in phosphorus compared with the phosphoric ores of Europe, consequently the pig iron from these comparatively low phosphorus ores has not contained enough phosphorus to produce a slag rich in phosphates. At the same time the comparatively high silicon content of the pig iron made from domestic ores adapts them to the process hereinafter described; for which the comparatively low silicon pig iron of the European ores is not so well adapted.

In an application of William R. Walker, No. 865,504 filed October 7th, 1914 there is described the method by which the slag will be made richer in phosphates than if the pig iron were converted into steel directly in the open-hearth or electric furnace; pig iron being first blown in an acid Bessemer converter, to desiliconize it to the extent desired; a fairly high percentage of silicon in the pig iron facilitating this blowing operation, after which the Bessemer metal, with the silicious slag thoroughly removed therefrom, is transferred to the open-hearth or electric furnace and treated with a lime and ore slag. When this treatment is continued long enough to enable the slag to extract the greater part of the phosphorus, such slag is withdrawn by pouring it over the lip of a tilting furnace into slag cars or the like and is conveyed to grinding machines for reducing it to the best size for use as a fertilizer. After withdrawing the phosphoric slag a second or finishing slag is added to the furnace to complete the refining operation in the usual way. This process makes it possible to secure a slag commercially available as a fertilizer from comparatively low phosphorus ore or pig iron; and increases the percentage of soluble phosphates in slags from ore or pig iron of high phosphorus content.

Our invention provides certain improvements over the specific method described in the aforesaid Walker application whereby the slag in the open-hearth or electric furnace can be secured of more uniform character, whereby the bottom of the furnace is preserved in better condition and whereby we believe a better grade of steel can be produced.

Our invention includes certain features of improvement which are separately available. Instead of pouring off the high phosphorus slag from the surface of the metal in the open-hearth or electric furnace and replacing it by a refinishing slag in the same furnace we pour the metal and the high phosphorus slag out of the furnace into a ladle, from which the slag is poured off cleanly and completely, and then transfer the metal thus "roughed down" to a refining furnace where the ultimate refinement desired is accomplished. Or we cast the metal from the ladle after the first roughing down operation into ingots. The metal is quite pure and soft, with a high percentage of phosphorus, and is, therefore, of the best composition for certain uses such as making steel wire. Generally we will provide several roughing down furnaces with a capacity in excess of that of the finishing furnaces and will use the excess capacity for the manufacture of this high phosphorus steel; the remainder of the metal being passed through the second refining operation. The process is in fact a triplex process, the metal being passed first through converters of capacity sufficient to supply the roughing down open-hearths which constitute a second group of furnaces and being passed thereafter through a third group, the ultimate refining furnaces. The metal coming from the converters is low in carbon so that the steel produced is soft steel of high purity. High carbon steel, however, such as rail steel containing 0.60% carbon, may be made by recarburizing with molten pig iron or other suitable means in the refining furnace or in the ladle.

A second feature of improvement in our process consists in working the roughing down furnaces continuously, and preferably the refining furnaces also. This method saves time, enables us to secure greater uniformity in the high phosphorus slag and probably in the steel, and saves the bottom of the furnaces from exposure to the slag and constant injury. Where the furnace is emptied with each charge the slag or a portion of it strikes the bottom of the furnace, cutting it out to some extent and necessitating occasional repairs. Also some of the slag is apt to stick to the bottom and to modify the composition of the slag for the next heat. These disadvantages are avoided by our method of working continuously. At each operation upon the roughing down furnaces we withdraw only a part of the metal and of the slag; say about one-third of the metal and two-thirds of the slag. And we then refill the furnace by adding one-third new metal and the necessary quantities of slag ingredients. We thus maintain a very fluid slag. If more or less than two-thirds comes off into the ladle at one operation the difference can be roughly compensated for at the next operation.

In the roughing down furnace we use nearly the theoretical quantities of lime and oxid of iron necessary to eliminate the impurities of the metal; instead of a substantial excess of lime and oxid such as has been necessary where a complete refinement has been performed in a single operation. The fact that we use approximately only theoretical quantities enables us to secure a slag which is richer in phosphorus than would be the case if excessive quantities of lime and oxids were used. In the refining furnaces we have to use an excess of lime and oxid in the slag. But the raw material, as we may call it, for the refining furnace is of very high quality because of the use of nearly theoretical quantities of lime and oxids in the roughing furnace, for which reason the final refined product is probably better.

A specific example of our process is as follows: The metal upon which we have worked our process satisfactorily is the local metal at Birmingham, Alabama, which contains 0.8% to 1.00% of phosphorus (but metal much lower in phosphorus can by this process be made to yield a high phosphoric slag). This Birmingham pig iron is fairly high in silicon, containing say 0.8%. It is first blown in an acid Bessemer converter, the silicon contributing to the high temperature necessary and to the production of a very fluid blown metal from which the slag can be thoroughly separated. The blowing is continued until the silicon is practically all removed and a large part of the carbon and manganese are also removed, leaving a high phosphorus blown metal. This is then separated as completely as possible from the slag and transferred to the second or roughing down furnaces. For one charge of blown metal we generally use the product of three converters of about twenty tons each, two converters blown down to about 0.08% carbon and the third to about 0.75% carbon. Each of the three converters might be blown down to about 0.30% carbon, but the method used gives better control of the carbon content.

The roughing down furnaces, as well as the finishing furnaces which we have used are of the regenerative gas fired open-hearth tilting type. The roughing down furnaces are basic lined for the removal of the bulk of the phosphorus from the blown metal to produce what we have called duplex metal and the high phosphoric slag. The third furnaces are of the open-hearth regenerative gas fired type, either tilting or stationary and either acid or basic lined according to the specifications of the steel to be made. The roughing down furnaces are first charged with the necessary amount of lime and iron oxid to oxidize and carry into the slag the phosphorus contained in the blown metal. When a sufficient quantity of the blown metal has been charged and the slag is fluid and found to be of the right composition a measured quantity, say one-third, of the dephosphorized or duplex metal is poured, together with the slag, into a ladle provided with an overflow slag spout. When the duplex metal in the ladle reaches the level of the slag spout the bulk of the slag will have overflowed from the ladle into slag boxes or cars provided for the purpose. The roughing down furnace is then tilted back into position, the banks repaired and only sufficient lime and iron oxid charged to oxidize and carry the phosphorus in the further quantity of blown metal which is then added to take the place of that which has been removed. The dephosphorizing of the blown metal is a heat producing operation, so that a very small quantity of gas is consumed in this operation. The retaining of a certain amount of duplex metal in the roughing down furnace after each tap makes available all the lime and iron oxid charged for dephosphorizing the blown metal. Therefore, we are able to produce a fairly uniform phosphoric acid slag; whereas if the duplex metal were not retained in the receiver after each tap the lime and iron oxid charge would come in contact with the bottom of the receiver and would cause the slags to come irregularly in composition, more or less lime adhering to the bottom of the furnace after different heats so that the slags might at one time be deficient in lime or oxid and not be able to carry the phosphoric acid, while at another time the slag would contain too large a volume of lime or oxid and consequently too small per cent. of phosphoric acid.

The duplex metal is charged into the finishing furnaces and treated in the usual way, usually with basic slag and with ordinary additions to produce the grade of steel required. We have used as a charge in the finishing furnaces low phosphorus scrap and duplex metal together with a ladle of regular blown metal. There is very little cutting on the furnace bottom, very little oxid of iron being used and the carbon content of the bath being consequently very little reduced. The phosphoric acid content of the slag in this refining furnace is low, making the production of rail steel more reliable.

With the foregoing process we have made steel of very high quality and have secured a slag running considerably higher in soluble phosphates than the minimum of twelve to thirteen per cent. which is available commercially.

Though we have described with great particularity of detail a certain specific embodiment of our invention, yet it is not to be understood therefrom that the invention is limited to the particular embodiment described. Various modifications may be made by those skilled in the art without departing from the invention as defined by the following claims.

What we claim is—

1. The process of producing steel and a slag rich in phosphates which consists in desiliconizing pig iron, refining the desiliconized metal with a basic slag containing the necessary amount of lime and iron oxid to oxidize and carry into the slag the phosphorus contained in the desiliconized metal so as to take up the bulk of the phosphorus therein, and removing the duplex metal thus produced together with the high phosphorus slag and separating the latter from the duplex metal.

2. The process of producing steel and a slag rich in phosphates which consists in desiliconizing pig iron, refining the desiliconized metal with a basic slag containing the necessary amount of lime and iron oxid to oxidize and carry into the slag the phosphorus contained in the desiliconized metal so as to take up the bulk of the phosphorus therein, and removing the duplex metal thus produced together with the high phosphorus slag and separating the latter from the duplex metal, and further refining said duplex metal to reduce the remaining phosphorus therein.

3. The process of producing steel and a slag rich in phosphates which consists in desiliconizing pig iron, refining the desiliconized metal with a basic slag to take up the bulk of the phosphorus therein, and removing a part of the duplex metal and high phosphorus slag thus produced, and replacing the same with a new supply of desiliconized metal and of slag-forming materials so as to maintain a continuous supply of blown metal and dephosphorizing slag, and separating from the portion of duplex metal withdrawn the high phosphorus slag thereon.

4. The process of producing steel and a slag rich in phosphates which consists in desiliconizing pig iron, refining the desiliconized metal with a basic slag to take up the bulk of the phosphorus therein, and removing a part of the duplex metal and high phosphorus slag thus produced, and replacing the same with a new supply of desiliconized metal and of slag-forming materials so as to maintain a continuous supply of blown metal and dephosphorizing slag, and separating from the portion of duplex metal withdrawn the high phosphorus slag thereon, and further refining the duplex metal thus withdrawn and separated from its slag.

5. The process of producing steel and a slag rich in phosphates which consists in desiliconizing pig iron, treating the desiliconized metal, freed from its slag, with a new slag formed of substantially theoretical quantities of lime and iron oxid to dephosphorize the blown metal, removing the duplex metal and the high phosphorus slag thus formed, separating the slag and further refining the duplex metal with a slag containing an excess of lime and oxid to thoroughly dephosphorize it.

In witness whereof, we have hereunto signed our names.

ANSON W. ALLEN.
EUGENE GUY LILLY.